No. 12,709. REISSUED OCT. 29, 1907.

G. H. CHAPEL.

EYEGLASSES.

APPLICATION FILED MAR. 4, 1907.

Attest:

Edgeworth Greene

W. J. McGinn

George H. Chapel Inventor:

by H. A. West

Atty.

UNITED STATES PATENT OFFICE.

GEORGE H. CHAPEL, OF HOWELL, MICHIGAN.

EYEGLASSES.

No. 12,709. Specification of Reissued Letters Patent. Reissued Oct. 29, 1907.

Original No. 791,320, dated May 30, 1905, Serial No. 234,369. Application for reissue filed March 4, 1907. Serial No. 360,537.

*To all whom it may concern:*

Be it known that I, GEORGE H. CHAPEL, a citizen of the United States, residing at Howell, in the county of Livingston and State of Michigan, have invented certain new and useful Improvements in Eyeglasses, of which the following is a specification.

This invention relates in general to nose glasses, and more particularly to the construction and arrangement of the various parts or devices thereof coöperating collectively for retaining the same to place upon the nose of the wearer and individually for supporting the lenses in proper position with respect to the eyes.

The object of the invention is to provide a connection between the lens, brackets, and nose-bridge pivoted to the lenses by one and the same means.

With these and various other objects, advantages and improved results in view the invention consists in the novel construction and arrangement of parts wherein a rigid connection is made between the lens as regards vertical movement of the latter and with respect to any spring action on the part of the bridge or its ends and in the employment of the same element to make said connections, so as to permit a pivot movement of the lens on the bridge in the plane of vision and to fix the guards to the lens.

Figure 1:
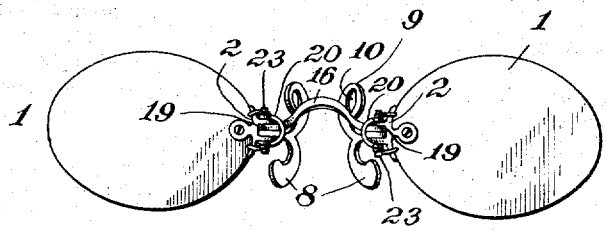
Figure 2:
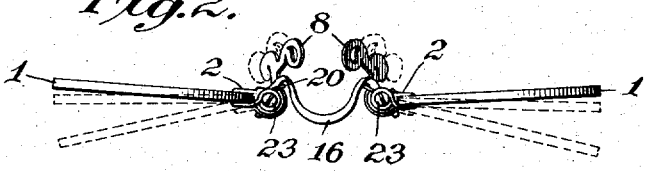
Figure 3:
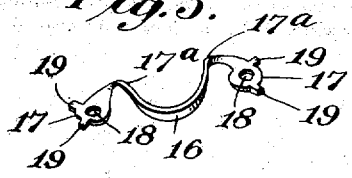
Figure 4:
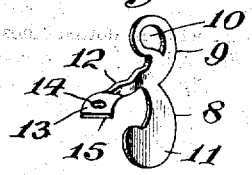
Figure 6:
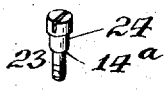
Figure 5:
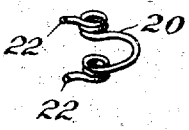
Figure 7:
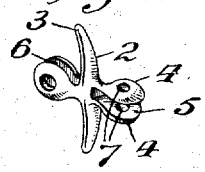
Figure 8:
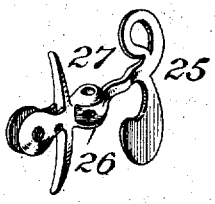

In the accompanying drawings, forming part of this application, Figure 1 is a perspective view. Fig. 2 is a top view showing in dotted lines the movement of the lens. Fig. 3 is a detail perspective view of the nose-bridge. Fig. 4 is a detail perspective view of one of the guards or plaquettes. Fig. 5 is a detail perspective view of one of the pivot-springs. Fig. 6 is a similar view of one of the studs. Fig. 7 is a similar view of one of the lens-brackets. Fig. 8 is a perspective view of a modification.

The same numeral references denote the same parts throughout the several views of the drawings.

In the application of my device to an ordinary lens 1 the bracket 2 has the usual lens-edge bearing 3 ears 4 formed on the said bearings, with a slot 5 between them at right angles to the opening 6 in the lens-bracket. The ears have central apertures 7, the lower one of which is screw-threaded. This arrangement of the ears obviates making the usual neck, lug, or projection from the bracket for connecting other parts of the device, and it affords a closer union of the parts of my invention with the lens.

The nose-guards 8 have preferably a curled top wing 9 with corrugated surface forming an aperture 10, a bottom wing 11, and a stem 12 all struck up from a flat piece, end 13 brought to right angles to the said wings by a half twist of stem 12. The end 13 is part circular to conform with ears 4 and has an aperture 14 and a straight edge 15 to bear against the base or end of the slot 5, which prevents its moving when clamped to place by a shoulder $14^a$ on a screw-stud 23.

The nose-bridge 16 is not of spring metal, and it is therefore not resilient, but is capable of being bent, if necessary, to suit various forms or shapes of the nose, though ordinarily such bending will not be found necessary, inasmuch as the bridge is only intended as a connection between the lenses and not to rest on or otherwise engage the nose. The bridge 16 has circular-shaped flat ends 17, which are turned outwardly and forwardly from the bridge to leave a neck $17^a$. The ends 17 have an aperture 18 and edge stop-lugs 19, which engage the base edge of the slot 5 to limit the movement of the lenses, which with the guards are controlled by a bowed or U-shaped spring 20, having coils and hook ends 22, and the bridge and guards are connected together and to the lenses by a screw-stud 23, having a journal-bearing 24 for the bridge ends 17.

In assembling the parts both lens connections being the same only one will be referred to. The bracket 2 having been clamped to a lens, the flat end of the guard and of the nose-bridge is placed in the slot 5 with the bottom of the U-shaped spring resting in the neck of the bridge and the ends of the spring hooked over the front edge of the lens-bearing 3. Then the stud is inserted through the spring-coils and through the top ear, bridge-end, and guard end into the screw aperture of the bottom ear. In this way the nose guards are pivoted to the ends of the nose-bridge, and the clamps which hold the lenses are also pivoted to the ends of the nose-bridge.

Referring to the modification shown in Fig. 8, the nose-guard 25 is made in the same piece with the bottom ear 26 of the lens-bracket 27. Otherwise this construction is the same as the preferred form.

It is well known that next to preparing lenses for correct vision it is of greatest importance to keep the lens against vertical movement, so that the vision may be through the center of the lens, for the least vertical variation will deflect the vision and impair the sight. Hence the importance of fixing the lenses permanently against vertical movement in placing and removing the glasses. This is fully accomplished by the inflexible bridge having such connection with the lens and guards as to permit opening and closing of the latter in the plane of vision without the least vertical movement of the lenses or any of the parts of the device.

Having thus described my invention, what I claim as new, and desire to secure by Letters Patent, is—

1. The combination with the bridge, the lens-clamps and the hinges having pivots for hinging the lens-clamps to the ends of the bridge of nose-guards held by the pivots of said hinges.

2. The combination with the bridge and a lens-clamp hinged to the end of said bridge of a nose-guard held by the pivot of said hinge.

3. The combination, with the bridge, of the lens-clamps and the nose-guards pivoted to said bridge and having common pivotal centers.

4. The combination with the rigid bridge and a lens-clamp hinged to the end of said bridge by a vertical pivot, of a nose-guard held by said vertical pivot and projecting back of said hinge and a spring engaging said nose-guard, substantially as and for the purposes set forth.

5. In eyeglasses, the combination with the bridge, the lens-clamps and the nose-guards, of pivots connected to the lens clamps and to which pivots the bridge and nose-guard are connected.

6. In eyeglasses, the combination with the bridge, a lens-clamp and a nose-guard, of a pivot connected to the lens-clamp and to which pivot the bridge and the nose-guard are connected.

7. In eyeglasses, the combination with the bridge, a lens-clamp and a nose-guard, of a pivot connected to the lens-clamp and to which pivot the bridge and the nose-guard are attached and a spring for turning the nose-guard and lens-clamp.

8. In eyeglasses, the combination with the bridge, of a lens-clamp, a nose-guard and a pivot connected to the lens clamp and to which pivot the bridge and nose-guard are connected, said pivot forming a common pivotal center for the lens-clamp and nose guard.

9. In eyeglasses, a lens-clamp, a vertical pivot held by said lens-clamp, a nose-guard journaled on said pivot, and a bridge held by said pivot.

10. In eyeglasses, a lens-clamp, a vertical pivot held by said lens-clamp, a nose-guard journaled on said pivot, a bridge held on said pivot and a spring for turning the lens-clamp and the nose-guard on said pivot.

11. In eyeglasses having the guards fixed to the lenses and adapted to be moved by the movement of the latter in the plane of vision, a nose-bridge connecting the lenses rigidly against vertical movement, a stud to fix the guards and pivot the bridge so as to permit horizontal movement of the lenses on the bridge, and a spring held by the stud ends and extending centrally from the studs onto the bridge to effect a pressure on the nose by the guards.

12. In eyeglasses, the one-piece lens-brackets having a slot at right angles to the lenses, guards provided with securing ends having a straight edge to engage the base of the slot, a bridge, and a stud at each end of the bridge to pivot the latter and to fix the guards.

13. In eyeglasses, a nose-bridge having ends provided with stop-lugs, lens-brackets having a slot the base edges of which engage the said lugs to limit the movement of the lens, the nose-guards, and the studs for pivoting the bridge and fixing the guards in the slot.

14. In eyeglasses, a nose-bridge having ends provided with stop-lugs, lens-brackets having a slot the base edges of which engage the said lugs to limit the movement of the lenses, the nose-guards, and the studs for pivoting the bridge and fixing the guards in the slots.

15. In eyeglasses, the lens-brackets, guards having stud apertures, the nose-bridge having stud-apertures, screw-studs extending through said apertures to fix the guards and pivot the bridge to the brackets, and the springs held by the studs and having a portion engaging the bridge with the spring ends engaging the brackets.

16. In eyeglasses, the combination, with the lens-brackets, having a slot at right angles to the lenses, and nose-guards fitting the slot and having ends provided with a straight edge to engage the base of the slot, of the nose-bridge having ends fitting the slot and provided with stop-lugs adapted to be engaged by the base edges of the slot to limit the pivot movement of the lenses and guards, springs looped over the bridge with their ends engaging the brackets to give the guards pressure on the nose, and the studs fixing the guards to the brackets and forming a pivot for the lenses.

17. In stiff-bridge eyeglasses, having lenses movable in line with the plane of vision, the combination, with the lens-brackets having ears with a slot therebetween at right angles to the lenses, and guards or plaquettes fitting the slots, of the bridge having necks and ends which fit the said slots, springs having a bow fitting the bridge-necks with coils resting on the said ears and the ends of the springs engaging the lens-brackets, and the studs extending through the coils and ears to fix the guards to the lenses and to pivot the latter against vertical movement.

In witness whereof I hereunto set my hand in the presence of two witnesses.

GEORGE H. CHAPEL.

Witnesses:

A. A. MONTAGUE,
A. D. THOMPSON.